United States Patent
Kelley et al.

(10) Patent No.: US 6,586,124 B2
(45) Date of Patent: Jul. 1, 2003

(54) METHOD AND APPARATUS FOR COLD TEMPERATURE OPERATION OF FUEL CELLS UTILIZING HYDRIDES HAVING DIFFERENT HEAT CAPACITIES

(75) Inventors: Ronald J. Kelley, Coral Springs, FL (US); Steven D. Pratt, Plantation, FL (US); Sivakumar Muthuswamy, Plantation, FL (US); Robert W. Pennisi, Boca Raton, FL (US)

(73) Assignee: Motorola INC, Schaumburg, IL (US)

( * ) Notice: Subject to any disclaimer, the term of this patent is extended or adjusted under 35 U.S.C. 154(b) by 42 days.

(21) Appl. No.: 09/817,336

(22) Filed: Mar. 26, 2001

(65) Prior Publication Data

US 2002/0136937 A1 Sep. 26, 2002

(51) Int. Cl.⁷ ................................................. H01M 8/04
(52) U.S. Cl. ............................... 429/17; 429/12; 429/13; 429/218.2
(58) Field of Search ............................... 429/12, 17, 13, 429/218.2; 420/900

(56) References Cited

U.S. PATENT DOCUMENTS

| | | | |
|---|---|---|---|
| 5,314,762 A | 5/1994 | Hamada et al. ................. 429/37 |
| 5,445,099 A * | 8/1995 | Rendina ........................ 114/140 |
| 5,753,383 A | 5/1998 | Cargnelli et al. .............. 429/13 |
| 5,862,855 A | 1/1999 | Balk ........................... 165/104.12 |
| 6,182,717 B1 * | 2/2001 | Yamashita ...................... 141/18 |
| 6,277,509 B1 * | 8/2001 | Wheeler ........................ 429/17 |

FOREIGN PATENT DOCUMENTS

| | | | | |
|---|---|---|---|---|
| JP | 05047400 A | * | 2/1993 | ............ H01M/8/06 |
| JP | 2000340242 A | * | 12/2000 | ............ H01M/8/04 |

* cited by examiner

Primary Examiner—Carol Chaney
(74) Attorney, Agent, or Firm—Randi L. Dulaney

(57) ABSTRACT

An apparatus and method for temperature regulation of a fuel cell using differential heat capacity of the fuel storage media is disclosed. The method of regulating the temperature involves measuring the temperature of one or more fuel cells, comparing the temperature against target values, selecting a control method from a set of available control methods based on the result of comparison and using that control method to initiate and control a regulation cycle, and actuating a flow control means using the selected control method to alter the flow of fuel between one or more fuel storage containers, each containing fuel storage media which exhibit different enthalpies of formation and dissociation. The regulation process starts with measuring temperature (110) of a fuel cell system (100). The measured temperature is then compared (120) to a predetermined set of ideal target values designed to provide peak fuel cell performance. Following the comparison step, a control method (130) is selected from a list of available control methods. The control method has the necessary parameters and logic to define an fuel flow initiation process (140) which in turn actuates a flow control means (150). Actuation of the flow control means changes the temperature of the one or more fuel cells and alters its operating parameters (160).

10 Claims, 6 Drawing Sheets

METHOD AND APPARATUS FOR COLD TEMPERATURE OPERATION OF FUEL CELLS UTILIZING HYDRIDES HAVING DIFFERENT HEAT CAPACITIES

TECHNICAL FIELD

This invention relates to fuel cells in general and a system and method for regulating the temperature of a fuel cell to enable operation in low temperature environments.

BACKGROUND

Fuel cells are electrochemical cells in which a free energy change resulting from a fuel oxidation reaction is converted into electrical energy. A typical fuel cell consists of a fuel electrode (anode) and an oxidant electrode (cathode), separated by an ion-conducting electrolyte. The electrodes are connected electrically to a load (such as an electronic circuit) by an external circuit conductor. In the circuit conductor, electric current is transported by the flow of electrons, whereas in the electrolyte it is transported by the flow of ions, such as the hydrogen ion ($H^+$) in acid electrolytes, or the hydroxyl ion ($OH^-$) in alkaline electrolytes. Gaseous hydrogen has become the fuel of choice for most applications, because of its high reactivity in the presence of suitable catalysts and because of its high energy density. Similarly, at the fuel cell cathode the most common oxidant is gaseous oxygen, which is readily and economically available from the air for fuel cells used in terrestrial applications.

The ionic conductivity of the electrolyte is a critical parameter that determines the efficiency and operating condition of a fuel cell. In the case of solid polymer electrolyte membrane (PEM) fuel cells, the ionic conductivity of the electrolyte membrane is dependent on the hydration level of the membrane as water molecules are involved in the transport of hydrogen ions across the electrolyte. Typically, fuel cells operate well in the fully hydrated, essentially water-saturated conditions and at room temperature. When the temperature of the cell and in turn, the temperature of the electrolyte membrane drops significantly below room temperature, the performance of the fuel cell deteriorates. This dependency on water content of electrolyte inhibits operation of fuel cells at temperatures below freezing. At these low temperatures the ion mobility of the electrolyte is severely impaired and hence the output of the fuel cell system drops. Therefore, for practical operation of PEM fuel cell systems in cold environments, additional mechanisms are needed to raise and keep the temperature of the fuel cell above the ambient temperature.

Some of the prior art approaches to address this problem involved addition of heaters, catalytic burners, thermal insulation or secondary power sources to the fuel cell system to raise temperature of the fuel cell before startup in low temperature environments. For example, Hamada et al. (U.S. Pat. No. 5,314,762) teaches the use of a catalytic burner in conjunction with a fuel cell to preheat the fuel cell. Others such as Cargnelli et al. (U.S. Pat. No. 5,753,383) describe a fuel cell system incorporating a catalytic burner and a thermoelectric element for operation in low temperature environments. Although the prior art techniques solve the problem of low temperature fuel cell operation, they add complexity and cost while reducing the efficiency of the fuel cell system.

DETAILED DESCRIPTION OF THE PREFERRED EMBODIMENT

An apparatus and method for temperature regulation of a fuel cell using differential heat capacity of the fuel storage media is disclosed. The method of regulating the temperature involves measuring the temperature of one or more fuel cells, comparing the temperature against target values, selecting a control method from a set of available control methods based on the result of the comparison and using the selected control method to initiate and control a regulation cycle, and actuating a flow control means to alter the flow of fuel between one or more fuel storage containers, each of which contain fuel storage media which exhibit different enthalpies of formation and dissociation.

Figure 1:
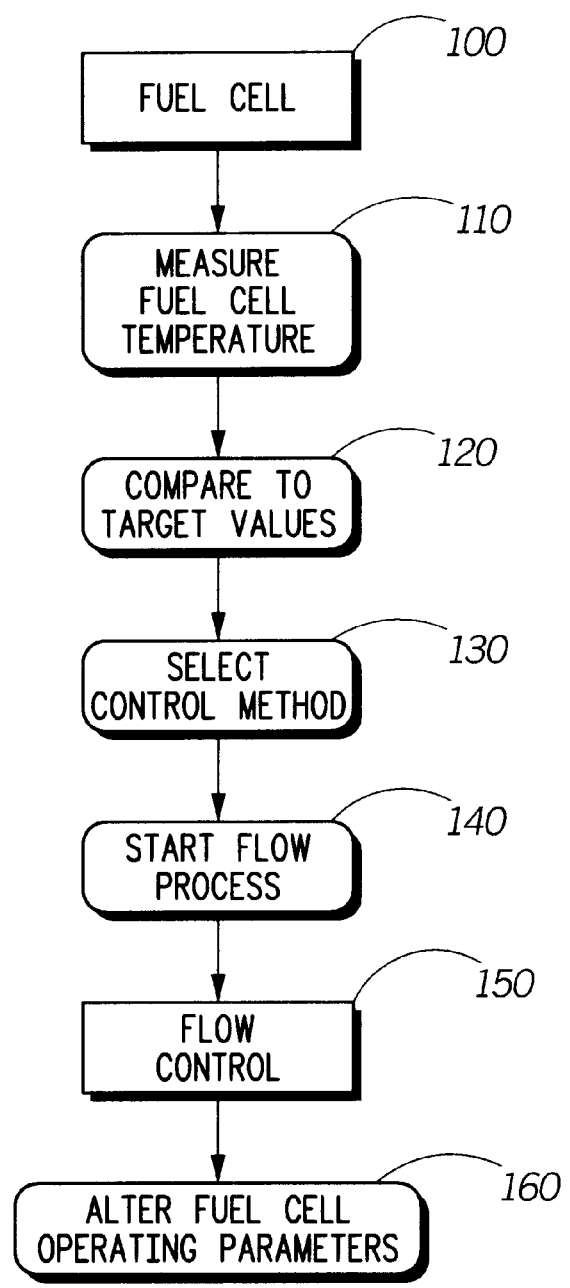
FIG. 1 is a process flow diagram in accordance with a first embodiment of the present invention.

A typical flow chart of the process used to regulate the temperature of a fuel cell according to a first embodiment of the present invention is shown in FIG. 1 where the rectangular boxes represent structural entities in the process, and boxes with rounded corners represent process steps to achieve the various structural entities. Referring now to FIG. 1, the regulation process starts with measuring the temperature 110 of a fuel cell system 100. Typical measurement methods that are appropriate for this task are thermocouples, thermistors, resistors, RTD, infrared sensors, and diodes. Although the preferred embodiment has listed some of the more commonly used temperature measurement methods, the present invention is not necessarily limited by the use of these methods. Any temperature measuring method can be used within the structure described in the preferred embodiment. The temperature is then compared 120 to a predetermined set of ideal target values designed to provide peak fuel cell performance. The goal of this comparison is to assess how close the temperature of the fuel cell under observation is to an ideal or "optimized" operating condition.

Following the comparison step 120, a control method 130 is selected from a list of available control methods. The control method has the necessary parameters and logic to define a fuel flow initiation process 140 which in turn actuates a flow control means 150. Some of the key parameters defined in the control method include the extent and rate of flow between first and second fuel storage containers, the direction and duration of flow between the two containers, and the fuel flow quantity into the target fuel cell. Actuation of the flow control means 150 changes the temperature of the one or more fuel cells and alters its operating parameters 160.

Figure 2:
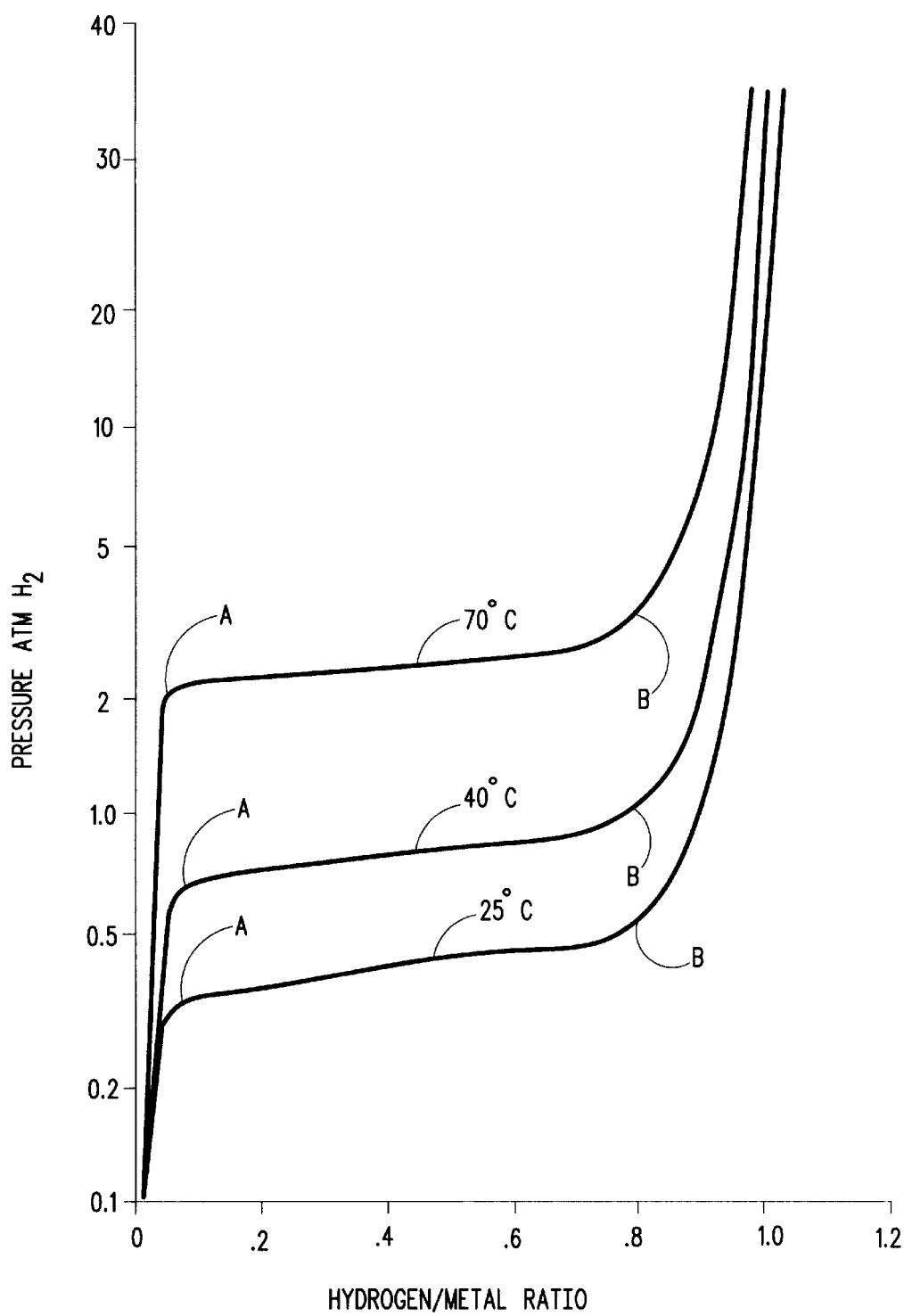
FIG. 2 illustrates the static absorption-desorption isotherms for a selected metal hydride material.

FIG. 2 illustrates isothermal plots of hydrogen absorption by a metal hydride, in this case, $LaNi_{4.7}Al_{0.3}$. Most elemental metals will absorb hydrogen when gaseous hydrogen ($H_2$) is brought into contact with the metal (M) surface. In this phase, hydrogen exists in solution in the metal. The absorption can be written as: $M \leftrightharpoons MH_2$. The use of the double arrow means that the reaction can occur in both directions. The pressure of the hydrogen gas determines the direction. At high initial pressure, hydrogen goes into the metal. After a period of time, equilibrium is reached and hydrogen goes into the metal at the same rate as it leaves the metal. If the hydrogen gas pressure is reduced, hydrogen will flow out of the metal and into the surrounding environment. If the environment is a closed container, the pressure will eventually build up to a point where equilibrium is reached once again. This simple hydrogen absorption process is linear in pressure and is represented by the sharply upwardly sloping linear portion 210 of the absorption isotherms. In a metal hydride system, once above a certain pressure (depicted as A in FIG. 2) the hydrogen gas ($H_2$) is adsorbed onto the metal surface, where it dissociates into hydrogen atoms (H) and enters interstitial sites in the lattice. In this second phase, corresponding to the nearly horizontal portion 220 in the graph, hydrogen atoms can be added to the metal with minimal or no corresponding increase in pressure. This plateau region 220 represents the two-phase equilibrium region. Saturation is reached at a value of the hydrogen to metal ratio (H/M) where all of the interstitial sites have been filled. At that point (depicted as B in FIG. 2) no additional hydrogen can be added to the metal lattice and further increase in hydrogen requires a corresponding increase in pressure as represented by the sharply upwardly sloping linear portion 230 of FIG. 2. This entire process is reversible, with some degree of hysteresis, and is temperature dependent. FIG. 2 depicts a family of curves at three selected temperatures for the same hydride material. At a given temperature each specific hydride has a specific equilibrium pressure behavior. This relationship was first noted by van't Hoff and is represented by the relationship $\ln(P) = -B/T$, where P is the hydrogen pressure, A and B are the inflection points as noted in FIG. 2, and T is the temperature.

Figure 3:
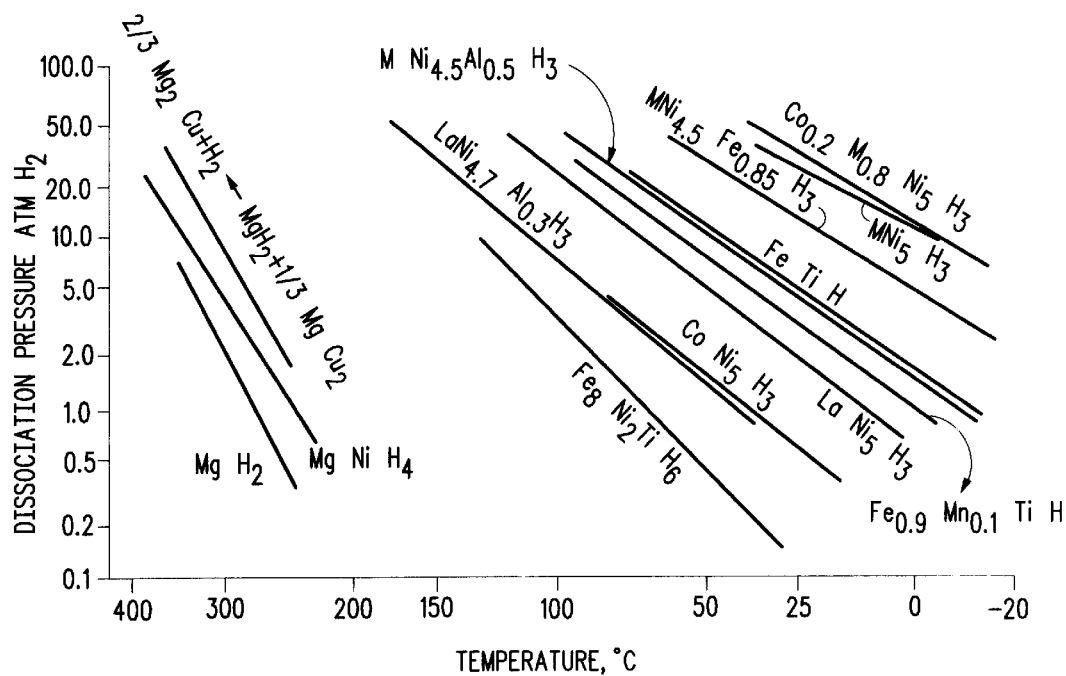
FIG. 3 shows van't Hoff desorption plots for various hydrides.
Figure 4:
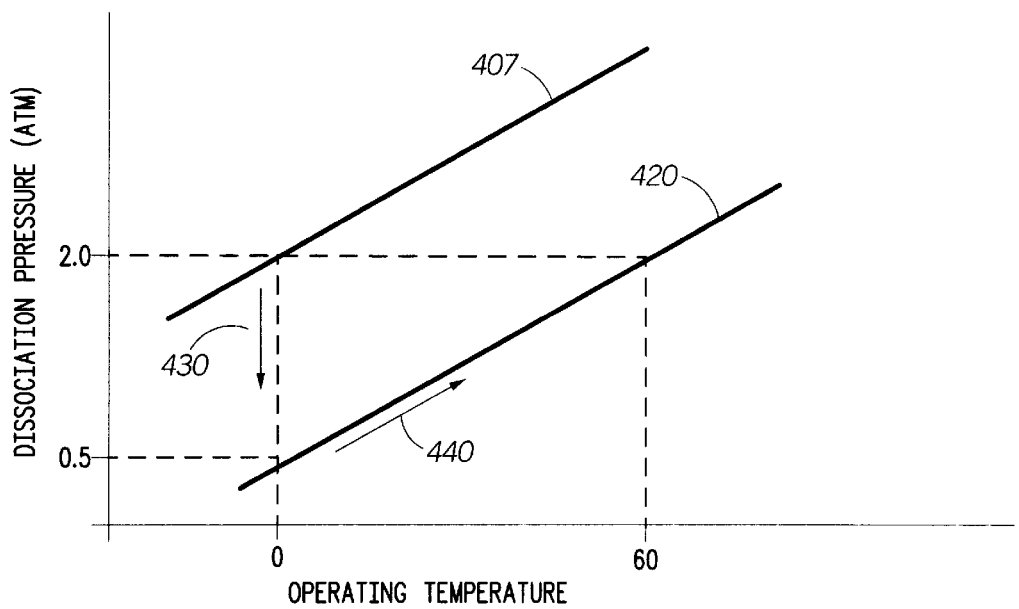
FIG. 4 schematically depicts van't Hoff desorption plots for two hydrides and illustrates their use in a heat pump arrangement.

FIG. 3 shows a series of van't Hoff plots for several metal hydrides. Since the hydride formation is exothermic and the decomposition is endothermic, hydrogen can be transferred between two different hydrides, each in the two-phase equilibrium state, causing one system to gain heat and the other to loose heat. This is the principal behind the hydride heat pump. U.S. Pat. No. 5,862,855 by Balk describes the use of a metal hydride heat pump, and is hereby incorporated by reference. In order to further elucidate how our invention aids in the startup of a fuel cell in cold ambient conditions, an illustrative example will now be depicted. FIG. 4 shows van't Hoff plots of two different metal hydrides, hydride 410 and hydride 420. Both hydrides are in their two-phase equilibrium states. For example, hydride 410 can be FeTiH and hydride 420 can be $LaNi_5H_3$. When the ambient temperature is at freezing (T=0° C.) hydride 410 is at equilibrium at about 2 atm. pressure and hydride 420 is at equilibrium at about 0.5 atm. (below room pressure). At start up, the flow control means 150 is opened to allow hydrogen to flow from hydride 410 in the first fuel storage container into the second fuel storage container that contains hydride 420, (part of the hydrogen is also sent to the fuel cell as fuel for the reaction). This action is represented by the arrow 430. Since hydride 420 was in thermal equilibrium with the fuel cell (T=0° C.), as it absorbs hydrogen its temperature rises, as indicated by the arrow 440. When the temperature of the hydride 420 reaches or exceeds the operating temperature of the fuel cell, the flow control means closes and the fuel cell then operates at the proper temperature, utilizing it's self generated heat and fuel from first fuel storage container with hydride 410. Once the fuel cell is operating at a suitable temperature, the waste heat from the fuel cell will keep hydride 420 at the operating temperature. Flow control means 150 can then be operated such that the fuel cell will operate on hydrogen supplied by hydride 420. Operation will continue until the pressure drops indicating that hydride 420 is slightly out of two-phase equilibrium phase and is ready for the next start up. The system can then be run exclusively off of hydrogen from hydride 410 until exhausted.

Although the preferred embodiment has described the use of two metal hydrides, other materials such as single walled carbon nanotubes, chemical hydrides, or organic hydrides that exhibit a change of enthalpy in the storage (exothermic) and release (endothermic) of hydrogen can be used to realize the apparatus without deviating from the scope of the invention.

Figure 5:
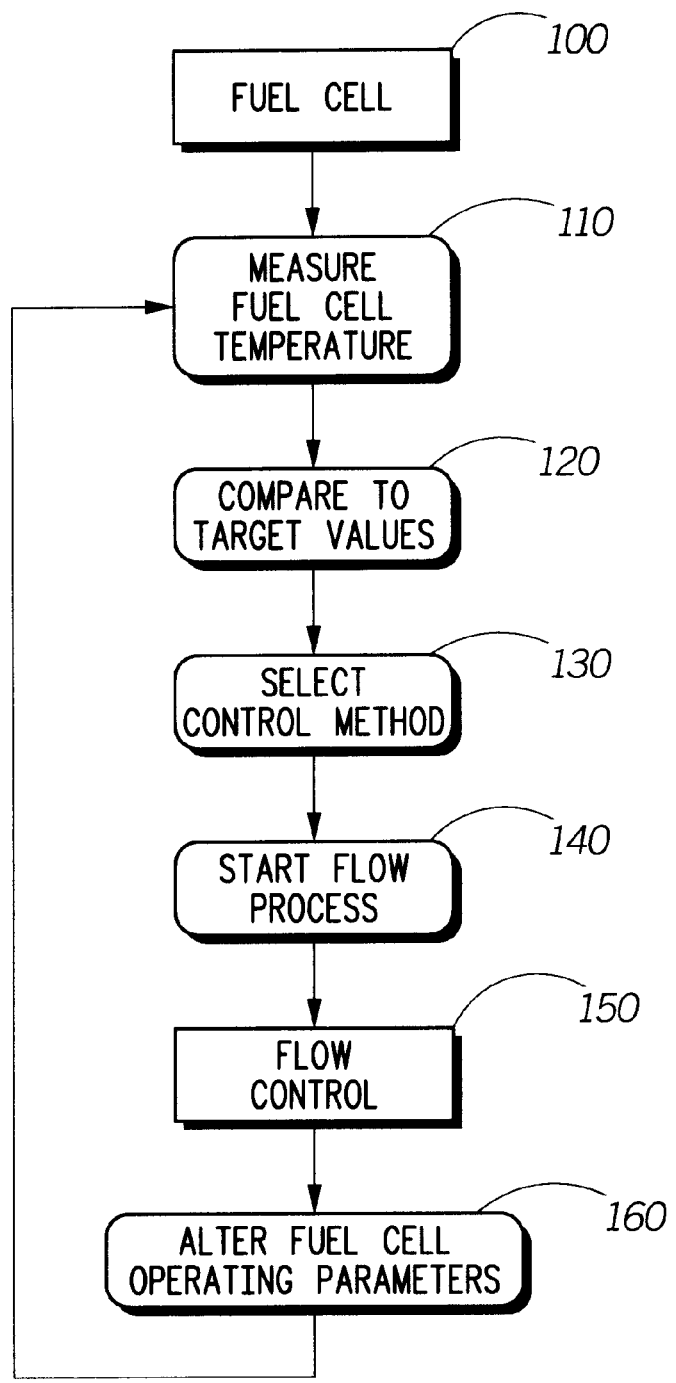
FIG. 5 is a process flow diagram in accordance with a second embodiment of the invention.

The second embodiment of the performance management method shown in FIG. 5, uses a closed-loop configuration with a feedback loop 570, wherein the change in operating parameters as a result of actuation of flow control means is fed back to the step of selecting the control method. The parameters and logic of the selected control method are fine-tuned based on the feedback information. This updated control method is used to update the flow control actuation process which in turn actuates the flow control means for a second time. This feedback and update process is repeated as necessary.

Figure 6:
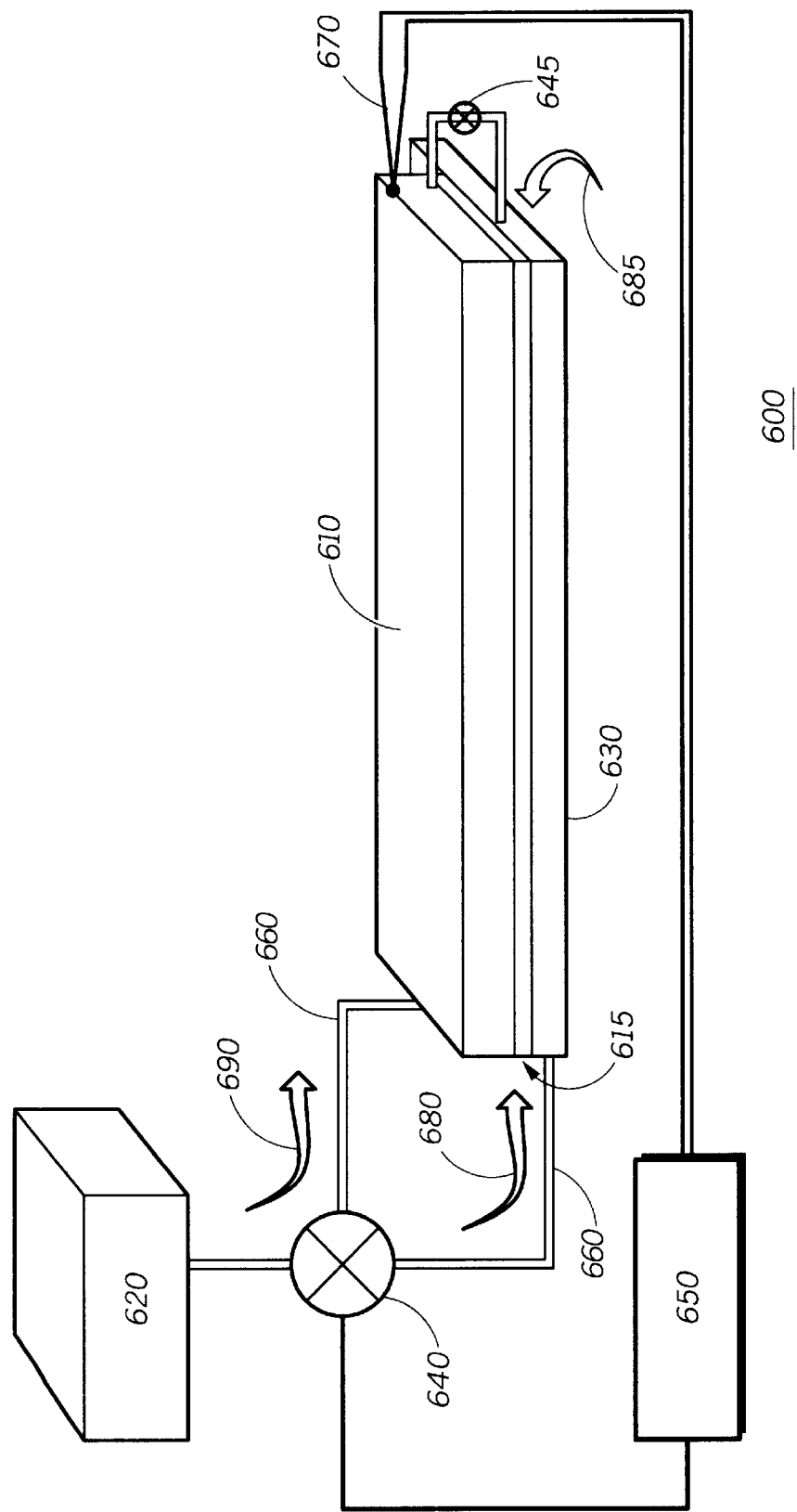
FIG. 6 is a schematic representation of a temperature regulation method in accordance with the invention.

The apparatus to implement the temperature regulation method described above consists of a heat pump composed of two hydrogen-absorbing materials and one or more fuel cells. The heat pump is regenerated using the waste heat of the fuel cells. The use of hydrides in heat pumps is well known in the art. FIG. 6 shows a schematic view of an apparatus for implementing the fuel cell temperature regulation method. The apparatus 600 consists of one or more fuel cells 610, a first fuel storage container 620, a second fuel storage container 630, a flow control means 640 between the first and second fuel storage containers, a flow control means 645 between the fuel cells and the second fuel cell container, and a control component 650. The fuel cell is in thermal contact 615 with the second fuel storage container 630. The thermal contact can be achieved by a variety of methods such as direct thermal contact between one or more of the fuel cells and the second fuel storage container, thermal contact through a thermally conductive medium disposed between one or more of the fuel cells and the fuel storage container, or convection means, such as fins, disposed on a major surface of one or more of the fuel cells and the fuel storage container. In the preferred embodiment, the thermal contact is realized through a thermally conductive medium disposed between one or more of the fuel cells and the fuel storage container. A fuel flow means 660 such as metal or plastic tubing connects the one or more fuel cells, the first fuel storage container and the second fuel storage container. The flow of fuel between the two storage containers is controlled by the operation of a flow valve that regulates the quantity of hydrogen passing from the two fuel storage containers to the fuel cell. The operation of the valve is in turn controlled by the control component 650. One or more temperature sensors 670 are attached to the fuel cells to measure the fuel cell temperature. The number of temperature sensors used per fuel cell and their location on the fuel cell can be customized based on the target operating environment and the design of the fuel cells. Since the temperature measurement technology is well known, one skilled the art can design a number of different of temperature sensor layouts. The temperature sensors are connected to the control component 650 so that the temperature of the cells can be monitored by the control component.

In a preferred embodiment of the apparatus, metal hydrides are used as fuel storage medium inside the fuel storage container and hydrogen is used the fuel. On start up, the flow control means 640 allows hydrogen to flow along path 680 from the first fuel storage container 620 to the fuel storage container 630. Initially the flow control means 645 between the fuel storage container 630 and the fuel cells 610 is closed so that the hydride media in the fuel storage container 630 absorbs hydrogen coming from fuel storage container 620. Because the hydrogen desorption is endothermic, the fuel storage container 620 cools and because the absorption of hydrogen by the hydride media in fuel storage container 620 is exothermic, temperature of fuel storage container 630 increases. As fuel storage container 630 is thermally coupled to the fuel cell, heat is transferred to the initially cold cell 610 from fuel storage container 630. After the fuel cell warms up, the flow control means 645 between fuel storage container 630 and the fuel cell 610 is opened, opening flow path 685 and the hydrogen flows into the fuel cell. Once the temperature of the fuel cell reaches a predetermined set point, the control component 650 shuts off the flow of hydrogen to fuel storage container 630 and opens the flow path 690 between the first fuel storage container 620 and the fuel cells 610. This is the normal operating mode for the system. When the temperature in the fuel cell rises above the disassociation temperature of hydride media in fuel storage container 630, hydrogen evolves from hydride 630 and can be used by the fuel cell. The control component opens and closes flow paths 680, 685 and 690 regulate the temperature of the fuel cell and to choose between fuel storage containers 620 and 630 as the source of hydrogen for the system at different times during its operation. Since the second fuel storage container 630 is primarily used as heat source to heat the fuel cell for startup in cold environments, it can be substantially smaller in size than the first fuel storage container 620, which is the primary fuel supply source. Also the metal hydride used in container 620 is optimized for storage of hydrogen while the hydride in container 630 is optimized for rapid hydrogen absorption for enabling quick cold start of the fuel cell.

Figure 7:
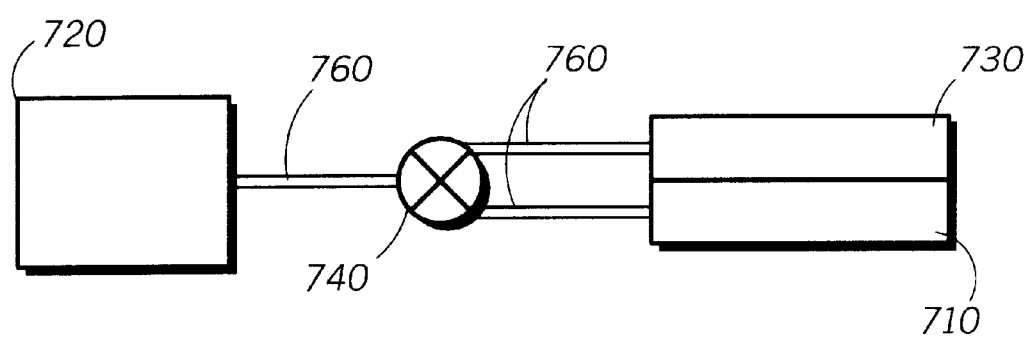
FIG. 7 is a schematic representation of another embodiment of the invention.

FIG. 7 illustrates still another embodiment of the invention, wherein two sources of hydrogen are used to start up a fuel cell. A first source of hydrogen 720 such as a container of a metal hydride, a carbon nanotube or a supply of compressed hydrogen gas provides the largest portion of the fuel needed to operate the fuel cell 710. Connected to the first source of hydrogen 720 is a second, smaller, source of hydrogen 730 that is a metal hydride that exhibits a change of enthalpy upon dissociation. The two hydrogen sources 720, 730 are connected to the fuel cell 710 by a three-way valve 740 and appropriate connecting gas passages 760. At startup, when all components are at about the same temperature, the pressure in the first source of hydrogen 720 is higher than the pressure in the second source of hydrogen 730, and when the valve 740 is opened, hydrogen from the first source 720 flows into the second source 730. Optionally, it may also flow into the fuel cell 710. The hydrogen moving to the second source of hydrogen 730 is absorbed by the metal hydride in an exothermic reaction, and some or all of the heat generated by the exothermic reaction is transferred to the fuel cell 710, which is in thermal contact with the second source of hydrogen. The removal of heat from the hydride allows the exothermic reaction to continue, and even more hydrogen flows into the second source. When the fuel cell is energized (i.e. begins to produce electricity), it also generates waste heat, which is transferred back to the second source of hydrogen 730. By appropriately configuring the three-way valve 740 and the size of the two hydrogen sources 720, 730 one can cause the system to achieve equilibrium while operating, without the need for operational sensors and controllers.

Although the preferred embodiment teaches the use of two containers with metal hydrides having different absorption/desorption characteristics, more than two containers with hydrides having different absorption/desorption characteristics can be used to realize this invention. The present invention enables startup and operation of fuel cells in low temperature environments. It also enhances the performance of a fuel cell by properly managing the temperature of the fuel cell through it operating regime. It achieves these results by using the differential heat capacity of different fuel storage media which are used to store the fuel used by the fuel cell. This method of using inherent dissimilarities in the properties of fuel storage materials eliminates the problems encountered with the prior art schemes requiring addition of heaters, catalytic burners, thermal insulation or secondary power sources to the fuel cell system to raise temperature of the fuel cell before startup. Thus, the present invention provides a method and an apparatus for managing the low temperature operation of a fuel cell which overcomes the disadvantages of the prior-art methods and devices of this general type. This novel temperature regulation method is simple to implement and control.

While the preferred embodiments of the invention have been illustrated and described, it will be clear that the invention is not so limited, and other equivalents will occur to those skilled in the art without departing from the spirit and scope of the present invention as defined by the appended claims.

What is claimed is:

1. A method of operating a fuel cell comprising:
    sensing the temperature of the fuel cell;
    comparing the sensed temperature to a set of predetermined parameters; and
    actuating a flow control means responsive to said comparison so as to release hydrogen from a first hydrogen storage means into a second hydrogen storage means containing a metal hydride, to initiate an exothermic reaction in the metal hydride sufficient to increase temperatures of the second hydrogen storage means and the fuel cell.

2. The method as described in claim 1, further comprising transferring heat generated by the fuel cell to the second hydrogen storage means during operation of the fuel cell to cause the release of hydrogen from the metal hydride.

3. The method as described in claim 2, further comprising a second step of actuating the flow control means, after the step of transferring, wherein the flow control means terminates the release of hydrogen from the first hydrogen storage means into the second hydrogen storage means.

4. The method as described in claim 3, further comprising a third step of actuating the flow control means, after the second step of actuating, wherein hydrogen is transferred from the second hydrogen storage means into the first hydrogen storage means.

5. The method as described in claim 1, wherein the step of actuating further comprises releasing hydrogen from the second hydrogen storage means to the fuel cell.

6. The method as described in claim 1, wherein the step of actuating further comprises releasing hydrogen from the first hydrogen storage means to the fuel cell.

7. A method of operating a fuel cell comprising:

opening a flow control valve so as to release hydrogen to the fuel cell and to release hydrogen from a first hydrogen storage means into a second hydrogen storage means containing a metal hydride, to initiate an exothermic reaction in the metal hydride sufficient to increase temperatures of the second hydrogen storage means and the fuel cell.

8. The method as described in claim 7, wherein heat generated by operation of the fuel cell is transferred to the second hydrogen storage means.

9. A method of operating a fuel cell system that includes a fuel cell, a first hydrogen storage device and a second hydrogen storage device, the second hydrogen storage device including a metal hydride, the method comprising:

storing a supply of hydrogen in the first hydrogen storage device; and controllably releasing the hydrogen from the first hydrogen storage device into the fuel cell and the second hydrogen storage device to initiate an exothermic reaction in the metal hydride sufficient to increase temperatures of the second hydrogen storage device and the fuel cell.

10. A fuel cell system comprising:

a fuel cell;

a first hydrogen storage container having a first equilibrium pressure at temperature T;

a second hydrogen storage container in direct physical and thermal contact with the fuel cell, the second hydrogen storage container including a metal hydride having a second equilibrium pressure at temperature T, the first equilibrium pressure being greater than the second equilibrium pressure; and a flow control valve for regulating a flow of hydrogen between the first hydrogen storage container, the second hydrogen storage container, and the fuel cell.

* * * * *